UNITED STATES PATENT OFFICE.

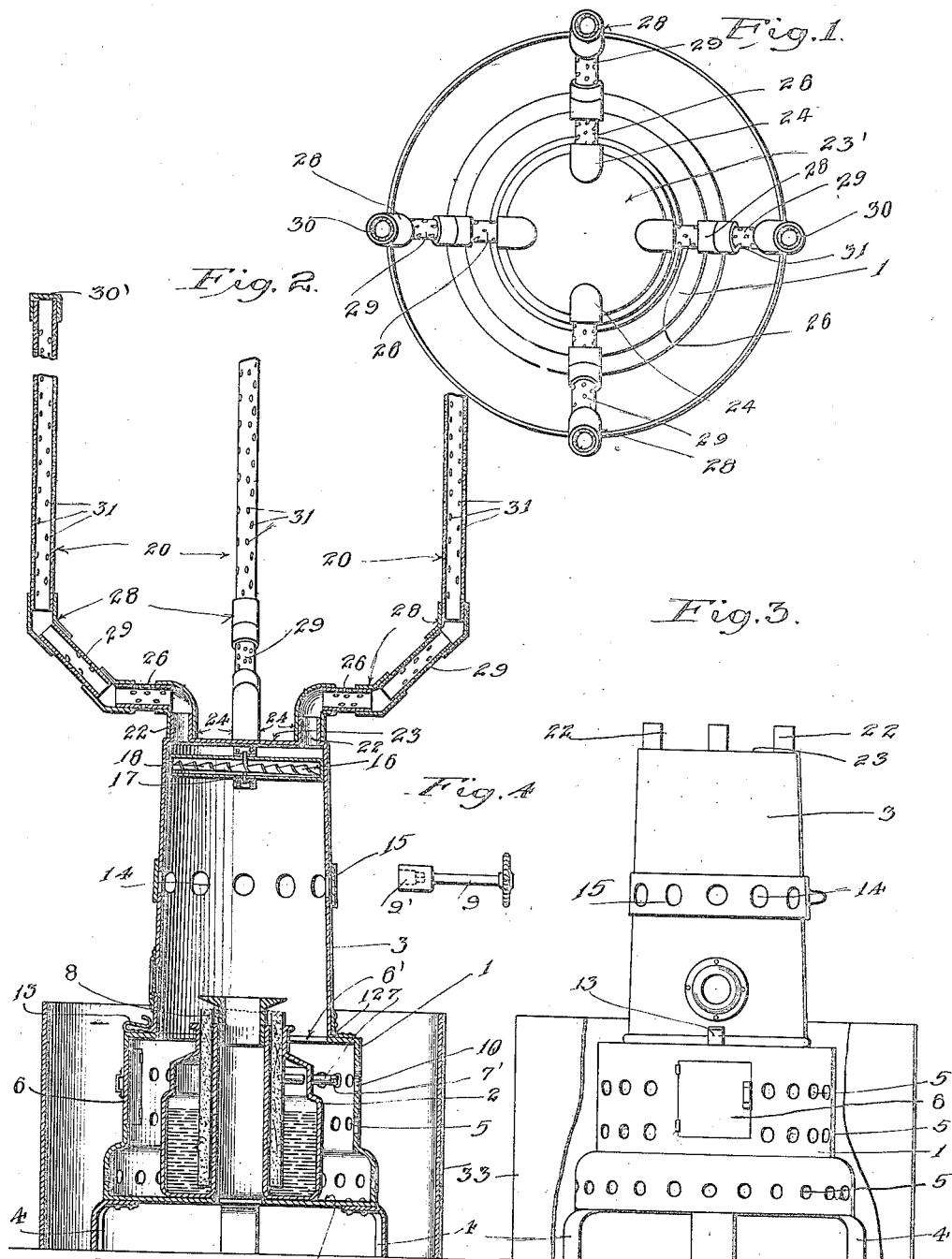

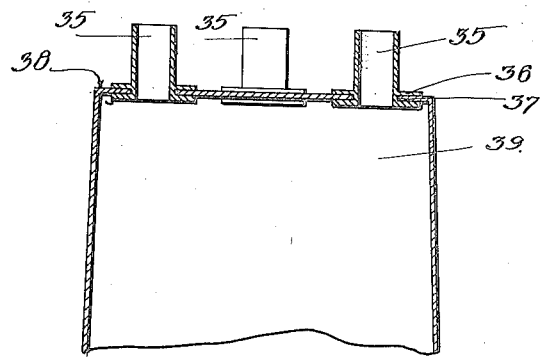
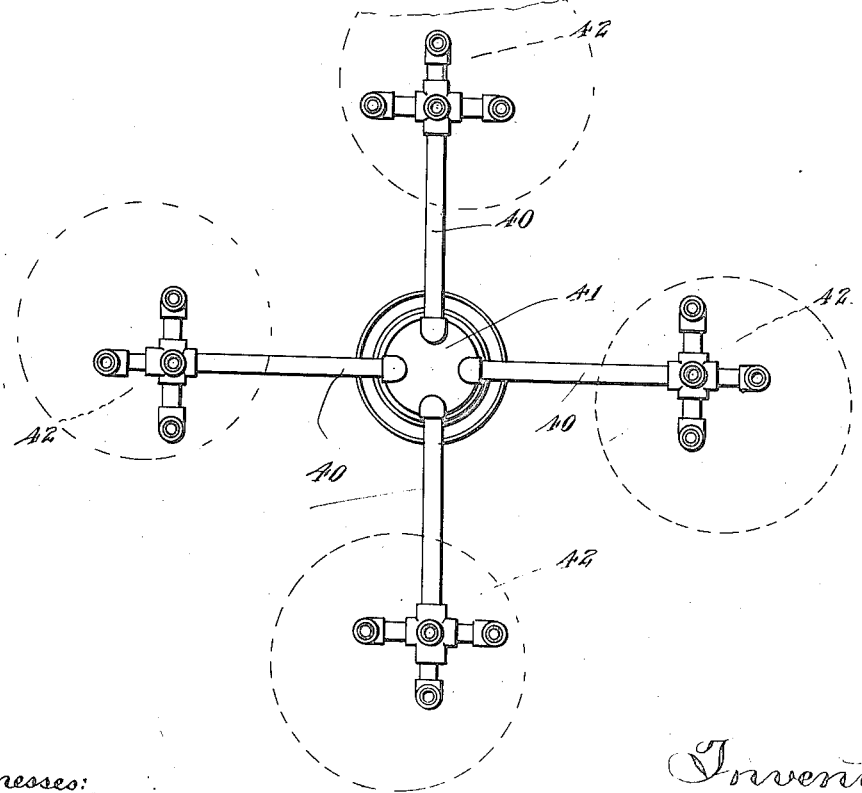

JOHN L. QUINN, OF LOS ANGELES, CALIFORNIA, ASSIGNOR TO STANDARD OIL COMPANY OF CALIFORNIA, OF SAN FRANCISCO, CALIFORNIA, A CORPORATION OF CALIFORNIA.

ORCHARD-HEATER.

1,222,794.  Specification of Letters Patent.  Patented Apr. 17, 1917.

Application filed December 29, 1913. Serial No. 809,239.

*To all whom it may concern:*

Be it known that I, JOHN L. QUINN, a citizen of the United States, residing at Los Angeles, in the county of Los Angeles and State of California, have invented a new and useful Orchard-Heater, of which the following is a specification.

This invention relates to means for heating orchards to protect the same from frost, and the main object of the invention is to provide a heater which will apply the heat effectively to the trees to be heated or protected.

A further object of the invention is to provide a heater which is adapted to deliver the heat directly under or within the trees to be protected, so that the foliage of the trees will be effective in retaining the heat.

Another object of the invention is to provide a heater of this character with improved means for distributing the heat as required.

Other objects of the invention will appear hereinafter.

The accompanying drawings illustrate the invention, and referring thereto:

Figure 1 is a plan view of the heater, with the distributing devices thereon.

Fig. 2 is a vertical section thereof.

Fig. 3 is a side elevation of the heater with the distributing devices removed and with the protecting wind shield partly broken away.

Fig. 4 is a side elevation of a key for the burner of the heater.

Fig. 5 is a vertical section showing a modification of the supporting means for the distributing pipes.

Fig. 6 is a diagrammatic plan view showing the application of the invention for heating several trees at once, from the same heater.

The heater comprises a casing 1 adapted to contain an oil burner 2 or other burner, a stack 3 extending upwardly from said casing 1, and distributing means on top of said stack. The heater casing 1 is mounted on suitable legs or supports 4, and said casing is provided with perforations 5 for admission of air to said burner, and with a door 6 for access to the burner. The burner 2 rests on the floor 1' of the casing 1 and is adapted to be inserted or withdrawn through an opening 6' in the top of said casing, when required. Said burner is provided with the usual means 7 for turning a wick 8, up or down, said means 7 being provided with a portion 7' adapted to receive a socket 9' of the controlling key 9, adapted to be inserted through an opening 10 in the side of the casing.

The stack 3 is hinged at 12 to the top of the casing 1, and is normally held in fixed position on the casing by a latch or catch 13. At its upper portion said stack is provided with air inlets 14 for admitting air to the heated products of combustion, so as to moderate the heat thereof, a damper ring 15 being provided for controlling the amount of air admitted in this manner. Above these air inlets 14 a mixing means is preferably provided, consisting of a fan 16 mounted to rotate on pivot pins 17 and carrying blades 18, said fan 16 being interposed in the upper part of the stack, so as to be rotated by the current of air passing therethrough, and to thereby cause effective mixture of the cool air from the inlets 14 with the hot products of combustion.

Distributing means are provided at the upper end of the stack, consisting of pipes 20 communicating with the stack and extending upwardly and outwardly therefrom. These pipes are movably mounted on the stack so as to be turned to any desired angular position. For this purpose thimbles or hollow nipples 22 are provided on the top 23 of the stack, and said pipes are provided with sleeves 24 surrounding and rotatably engaging said nipples. These sleeves 24 may be formed in the nature of elbows for receiving the first section 26 of said pipe. Each of the distributing pipes is preferably composed of a number of sections placed end to end and rotatably, loosely and removably connected together by elbows or couplings 28, said sections including inclined sections 29 and vertical sections 20, if desired. The couplings 28 are smooth interiorly and loosely telescope the respective ends of the sections, thus permitting the relative rotation and angular adjustment of the sections and the removal thereof so that the distributing pipes may be lengthened, shortened or adjusted to various angular positions to suit peculiar tree formations and to provide for effective distribution of heated air and smoke. By using any desired number of horizontal sections, such as 26, inclined sections such as 29, and vertical sections such as 20, any desired range or manner of distribution may be secured. The said pipe sections 26, 29 and 20 are perforated as shown at 31, for passage of the warm gaseous products therefrom. Sections 20 are provided with caps 30' at the top. With a plurality of distributing pipes fan 16 acts to cause a uniform distribution of heat from the heater into the inlet ends of all of the distributing pipes and prevents any back draft of cold air in any of said pipes which is apt to otherwise occur.

A wind shield 33 is preferably provided, consisting of a tubular shell of sheet metal surrounding the burner and casing, and open at the top so that air can pass downward within said shell and through the perforations 5 to the burner, but any wind is deflected by said shield, preventing the burner from being blown out or caused to burn unsatisfactorily by a strong wind.

The operation of this form of my invention is as follows: The burner 2 being ignited, the air entering through the openings 5 is heated by the products of combustion; the said burner and the hot products of combustion passing upwardly through the stack 3 are mixed with cool air entering through the inlets 14, so as to moderate the heat to a temperature at which it may safely be brought in direct contact with the foliage of the tree. The burner is placed directly under the tree or adjacent thereto and the distributing pipes are turned on their swivel supports and adjusted in such manner as to convey the heat into the interior of the tree, so as to distribute it more or less uniformly over the lower portion at least, of the tree. In this connection it may be understood that the pipes may be turned on their supporting nipples 22 and that each section of pipe may be turned on the preceding section so that the vertically extending sections 20 may be bent down to one side or the other by turning their collars 28 on the preceding inclined sections 29. By this manner the distributing pipes may be accommodated to any condition which may exist in practice, for example, to enable them to pass under or between interlacing branches of the trees. In this manner the heat at a moderate or safe temperature is delivered with substantial uniformity to the major part of the lower portion of the trees, providing substantially uniform protection of the trees and utilizing the heat with the greatest efficiency, since the foliage of the trees serves to retain said heat. This is particularly the case with orange trees where the foliage is very dense and is mostly at the ends of the branches, forming a more or less complete wall of foliage surrounding a comparatively empty space near the trunk; heat is applied to this comparatively empty space and gradually diffuses through the foliage, thereby protecting the foliage in the most uniform and effective manner.

It will be understood that any one or more of the sections 29 or 20 may be uncoupled and removed, the said sections slipping into or out of the couplings 28 and being held therein by friction, so that sections may be added or taken off as desired.

In place of swiveling the distributing pipes or nipples on the stack, said nipples may themselves be made revoluble on the top of the stack, as shown in Fig. 5, wherein each nipple or thimble 35 is provided with a grooved ring 36 engaging the edge of the opening 37 in the top 38 of the stack 39. In this case the distributing pipe or the first section thereof may be tight on this rotatable nipple, the adjustment of the pipe being effected by rotation of the nipple in its bearing.

While my invention is especially designed for use in heating individual trees, I may apply it as shown in Fig. 6, to heating several trees at once, the distributing pipes 40 from the heater 41 passing to several trees, as indicated at 42, and being perforated only at their ends where they pass into the trees.

What I claim is:

1. An orchard heater comprising a burner, a stack for the burner adapted to contain heated air and the products of combustion from the burner, and a plurality of angular perforated heat distributing pipes rotatably connected with the stack, each pipe comprising a plurality of relatively angularly adjustable perforated sections.

2. An orchard heater comprising a burner, a stack for the burner adapted to contain heated air and the products of combustion from the burner, and a plurality of angular perforated heat distributing pipes rotatably connected with the stack, each pipe comprising a plurality of relatively rotatable perforated sections, said pipes being closed at their outer ends.

In testimony whereof I have hereunto set my hand at Los Angeles, California, this 22nd day of December, 1913.

JOHN L. QUINN.

In presence of—
A. P. KNIGHT,
LORRAINE E. DURROW.